(12) United States Patent
Lessard

(10) Patent No.: US 11,555,684 B2
(45) Date of Patent: Jan. 17, 2023

(54) CLUTCH ALIGNMENT APPARATUS AND METHOD OF CLUTCH ALIGNMENT

(71) Applicant: Timothy Lessard, Monmouth, ME (US)

(72) Inventor: Timothy Lessard, Monmouth, ME (US)

( * ) Notice: Subject to any disclaimer, the term of this patent is extended or adjusted under 35 U.S.C. 154(b) by 419 days.

(21) Appl. No.: 16/899,684

(22) Filed: Jun. 12, 2020

(65) Prior Publication Data

US 2020/0393232 A1 Dec. 17, 2020

Related U.S. Application Data

(60) Provisional application No. 62/860,805, filed on Jun. 13, 2019.

(51) Int. Cl.
*G01B 5/25* (2006.01)
*F16H 9/12* (2006.01)
*B62M 27/02* (2006.01)

(52) U.S. Cl.
CPC .............. *G01B 5/25* (2013.01); *F16H 9/125* (2013.01); *B62M 27/02* (2013.01)

(58) Field of Classification Search
CPC .. G01B 5/25; G01B 5/02; F16H 9/125; F16H 55/56; B62M 27/02
See application file for complete search history.

(56) References Cited

U.S. PATENT DOCUMENTS

| 4,212,111 A * | 7/1980 | Saari .................... G01B 5/25 33/655 |
| D451,773 S * | 12/2001 | Stamback .................... D8/14 |
| 8,671,534 B2 * | 3/2014 | Huang ............... B25B 27/0064 29/280 |
| 2012/0186056 A1* | 7/2012 | Huang ............... B25B 27/0064 29/274 |
| 2020/0393232 A1* | 12/2020 | Lessard ................... F16H 9/125 |

* cited by examiner

*Primary Examiner* — Yaritza Guadalupe-McCall

(57) ABSTRACT

A clutch alignment apparatus and method of aligning a dual clutch system in a continuously variable transmission that enables a user to measure the alignment of the primary clutch and secondary clutch when the system is under a load that is similar to that which is applied when the system is operating under normal operating conditions.

11 Claims, 9 Drawing Sheets ure performance. The clutch preloader 10, also referred to as the "preloader," includes a clutch ring 12, standoffs 14, a housing 16, a tensioner 18, a strap 19, with a first end 19a and a second end 19b, and a spring 20, all best shown in FIGS. 1 and 2.

CLUTCH ALIGNMENT APPARATUS AND METHOD OF CLUTCH ALIGNMENT

BACKGROUND INFORMATION

Field of the Invention

The invention relates to tools and methods for aligning a dual clutch system in a continuously variable transmission, such as those commonly used with snowmobiles.

Discussion of Prior Art

Continuously variable transmissions, such as those used in snowmobiles, often include a primary clutch and a secondary that work in conjunction with one another to enable a motor to drive a track. A drive belt connects the two clutches, with the primary clutch sitting on the engine crankshaft and the secondary clutch connecting to the track drive.

Proper alignment of the two clutches, generally meaning that one clutch is positioned directly above the other clutch, is very important for belt life and performance. The standard procedure for aligning the two clutches is to align the clutches in an at-rest, no load, situation and to intentionally incorporate a small amount of misalignment or skew in the hope that when the system is under load the system is pulled into the correct alignment by that load.

This procedure worked reasonably well for a number of years in the past. However, many things have changed with the modern design of these systems. For example, modern snowmobile motors now have more torque, motor mounts have been changed to reduce vibration, and the secondary clutch is generally positioned directly over the primary clutch. With these modern improvements to snowmobile engineering and design the traditional method of clutch alignment is no longer sufficient.

What is needed, therefore, is an apparatus that enables a user to align the clutches in a manner that mimics the placement of the belt under the traditional in-use load and a method of using such an apparatus to achieve proper alignment.

BRIEF SUMMARY

The invention is an apparatus that enables a user to simulate normal operating conditions of a dual clutch system in a continuously variable transmission and a method of use of that apparatus. The method of use enables a user to measure the relative positions of the two clutches to determine how far out of alignment the clutches are relative to one another under a conventional load. Once the misalignment is known conventional methods may be used to adjust the position of either or both clutches to obtain a more optimal alignment of the clutches under normal operating conditions.

The apparatus includes a clutch pre-loader that has a clutch ring and a tensioner. The clutch ring secures to the primary clutch and the tension is inserted into the secondary clutch and allows the user to selectively apply a load to the two clutch that is similar to that of operating the motor. Once the load is applied the positions of the two clutches may be measured to determine whether the two clutches are in the proper alignment and, if not, help the user determine what adjustments need to be made to achieve proper alignment.

An alignment bar and a center-to-center measuring tool are provided to assist the user in taking measurements at the top, bottom, right side and left side of the secondary clutch and to measure the vertical distances between the two clutches.

The measurements are likely to be first taken with no load on the clutches to establish a baseline position and then again under load. Based on this information the user is able to use a conventional motor shimming kit to adjust the positions of the clutches, after which the loaded measurements are likely taken again to ensure the proper corrections were made.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
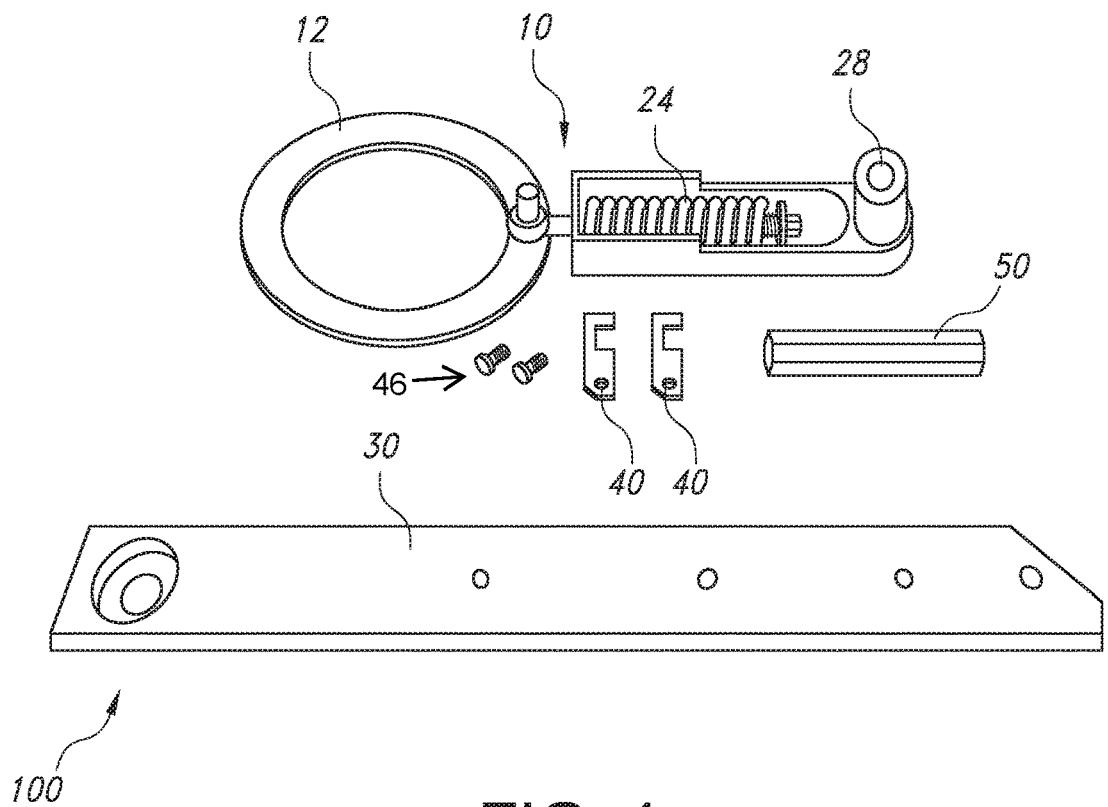
FIG. 1 is a top view of the apparatus according to the invention.
Figure 2:
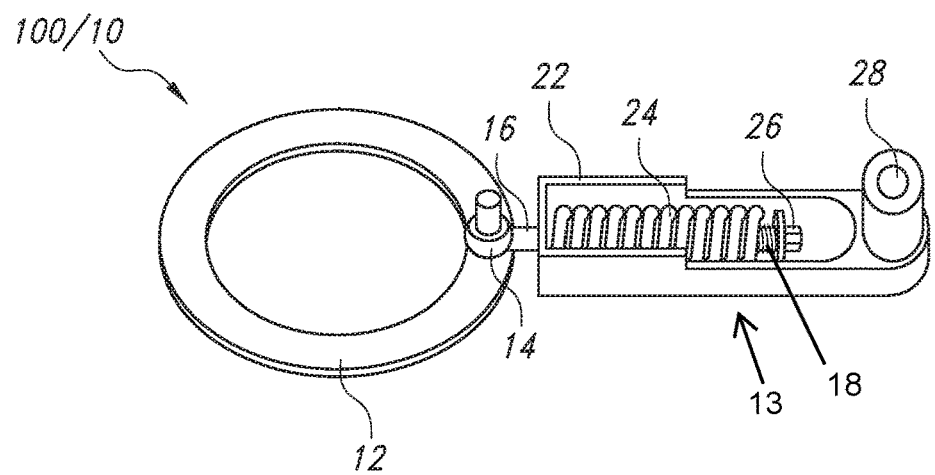
FIG. 2 is a top view of the preloader.
Figure 3:
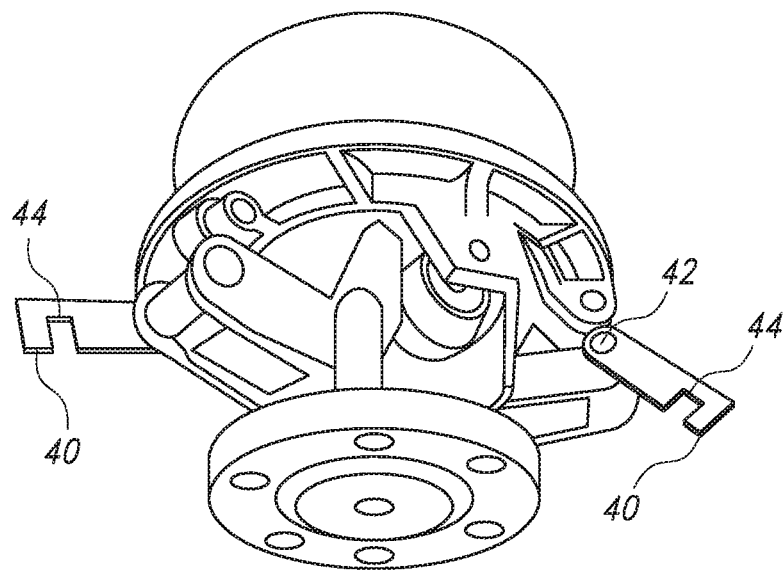
FIG. 3 is a top perspective view of the clutch ring retainers secured to the primary clutch.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-11B illustrate the clutch alignment apparatus 100 according to the invention for aligning a primary clutch and a secondary clutch in a continuously variable transmission ("CVT"). The apparatus 100 includes a clutch preloader 10, an alignment bar 30, and clutch retainers 40. The clutch preloader 10 places a load between a primary clutch PC and a secondary clutch SC, best shown in FIGS. 4 and 5, in order to simulate where the two clutches are positioned in different riding conditions and under different loads that are created be varying outputs of the motor. This allows a user to measure clutch alignment under a simulated load to see what the actual alignment is under various riding conditions. With this information a user is then able to shim the motor mounts using conventional techniques to improve alignment of the clutches SC, PC, when the machine is in a normal operating load, which reduces heat and slippage, and improves performance. The apparatus 100 and method of use is particularly advantageous for clutch alignment with snowmobiles that have a CVT, however, it may be used other types of vehicles having CVTs, such as, for example, those used with all-terrain vehicles.

The clutch preloader 10 includes a clutch ring 12 that is connected to a tensioner 13. The clutch ring 12 and tensionser 13 are connected by a spherical ball joint 14. The tensioner 13 includes a rod 16 that has a first end that is attached to the ball joint 14 and that has a second end 18 that is a threaded end 18 that extends into a spring housing 22. A standoff 28 is affixed to a side of the housing 22. A spring 24 is inserted over the rod 16 and secured in position by a preload fastener 26.

To use the preloader 10 it is likely that the snowmobiles side panels, hood, clutch guard, and cutch bolt access panel need to be removed in order to access the primary and secondary clutches. Once the clutches are exposed the clutch ring 12 is placed over the primary clutch PC and the round standoff 18 is inserted into the secondary clutch SC shaft. Once the preloader is attached in the proper manner a user is able to simulate different loads by adjusting the tensioner 13.

The spring 24 must have a sufficient spring rate to create the sort of load that created by a common engine. This may vary depending on the output of a specific engine, however, a spring having a spring rate of 500 pounds per inch ("lbs/in") is likely sufficient for the average snowmobile. A pneumatic/air cylinder or a hydraulic cylinder may also be used to create the load needed in place of the spring 24. Many conventional fasteners may be used for the preload fastener 26, such as, for example, a washer and nut.

Figure 4:
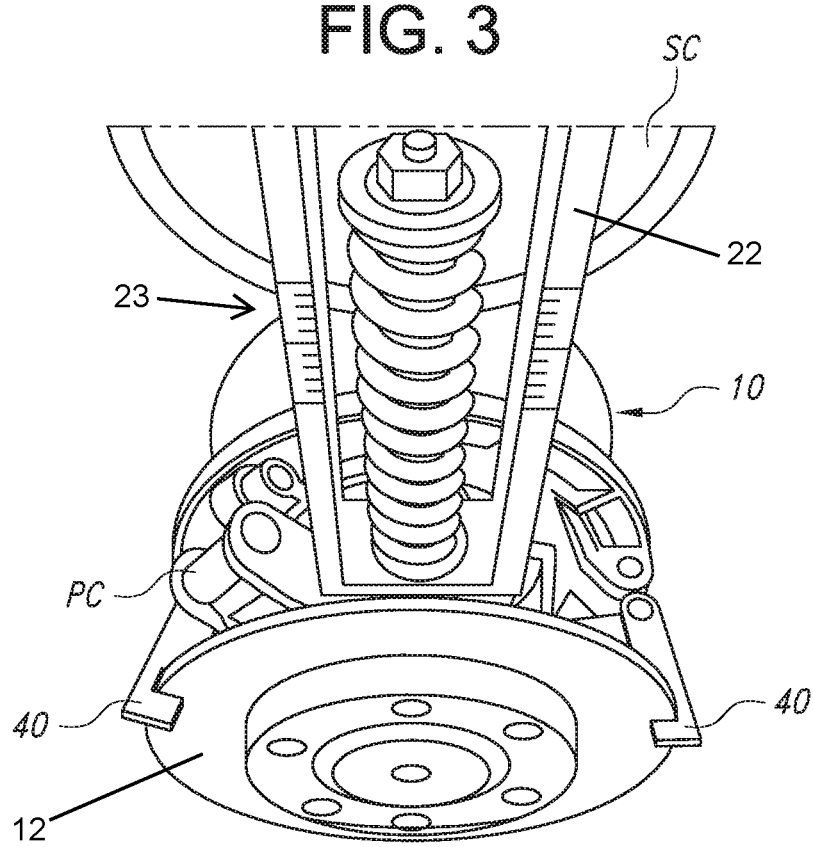
FIG. 4 is a top perspective view of the preloader secured to the primary and secondary clutches.
Figure 5:
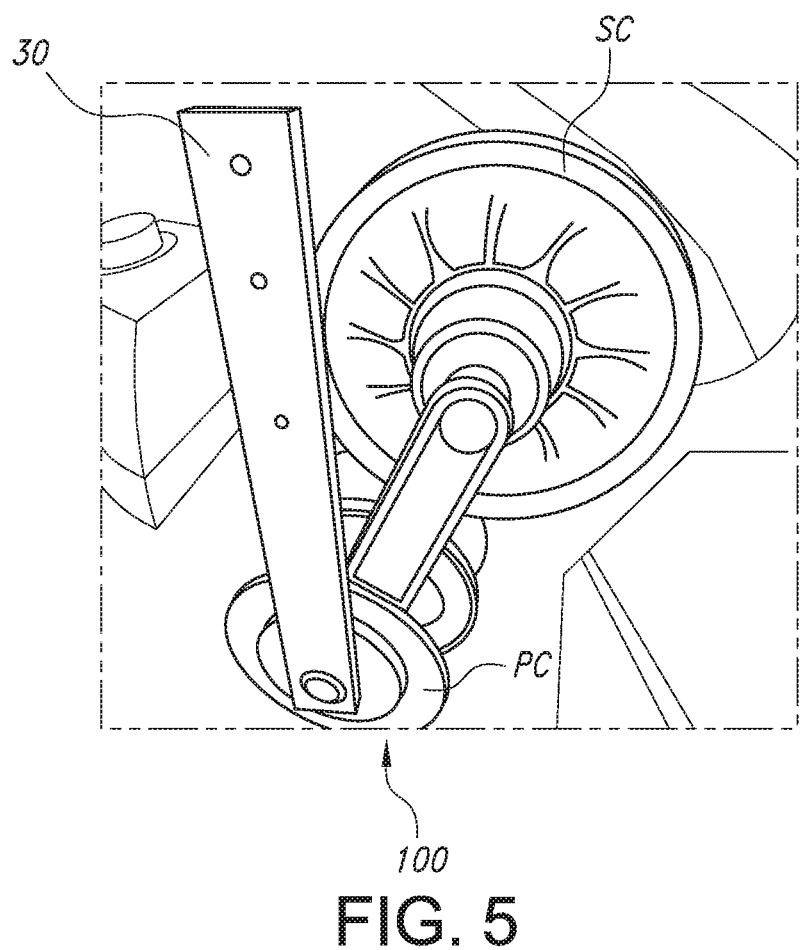
FIG. 5 is a front perspective view of the device in the secured to the primary and secondary clutches with the alignment bar in aposition for measurement.
Figure 6:
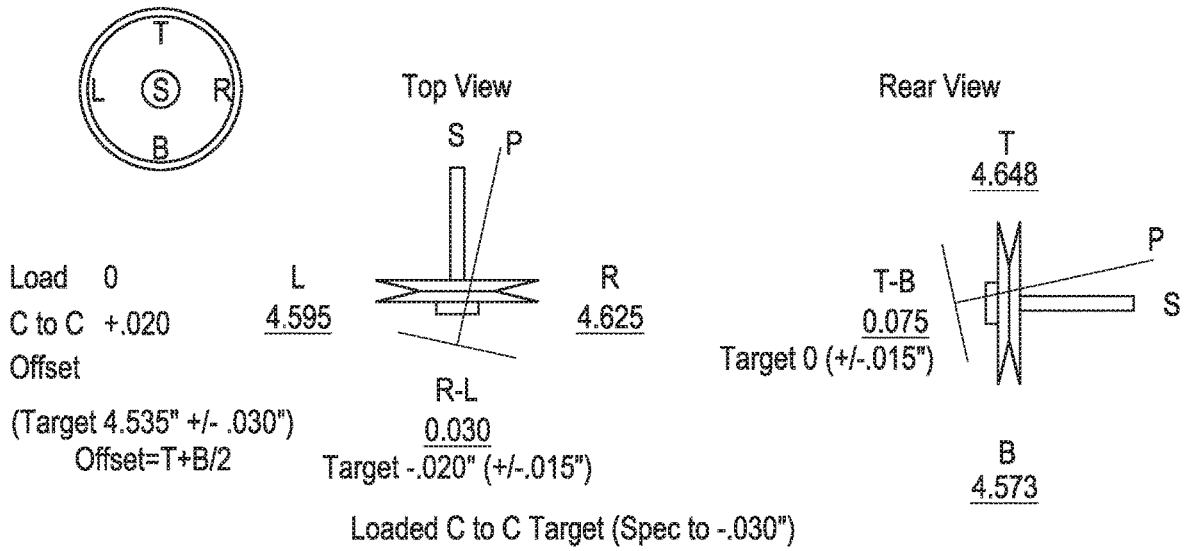
FIG. 6 illustrates an example testing and alignment sheet.
Figure 6:
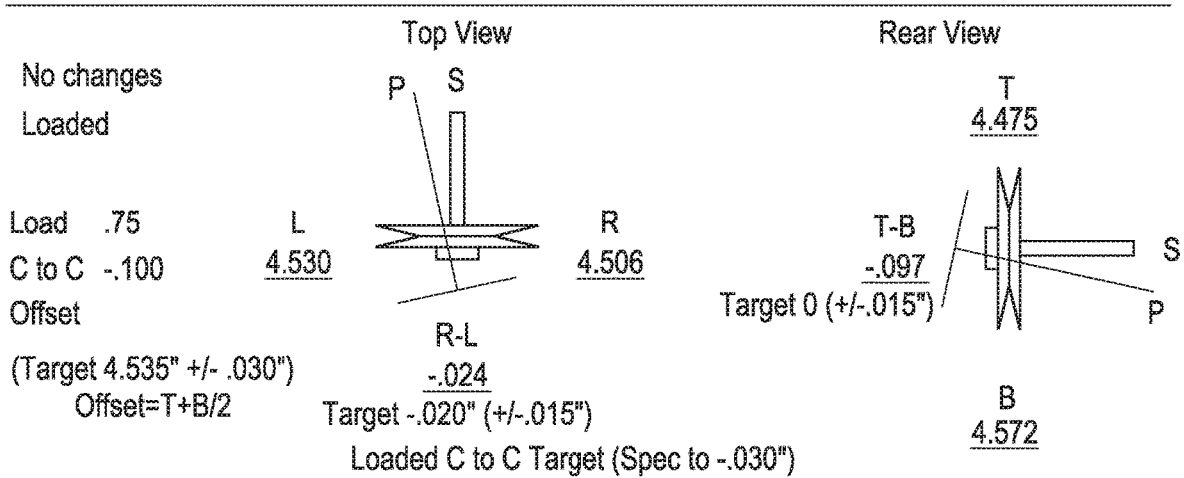
Figure 6:
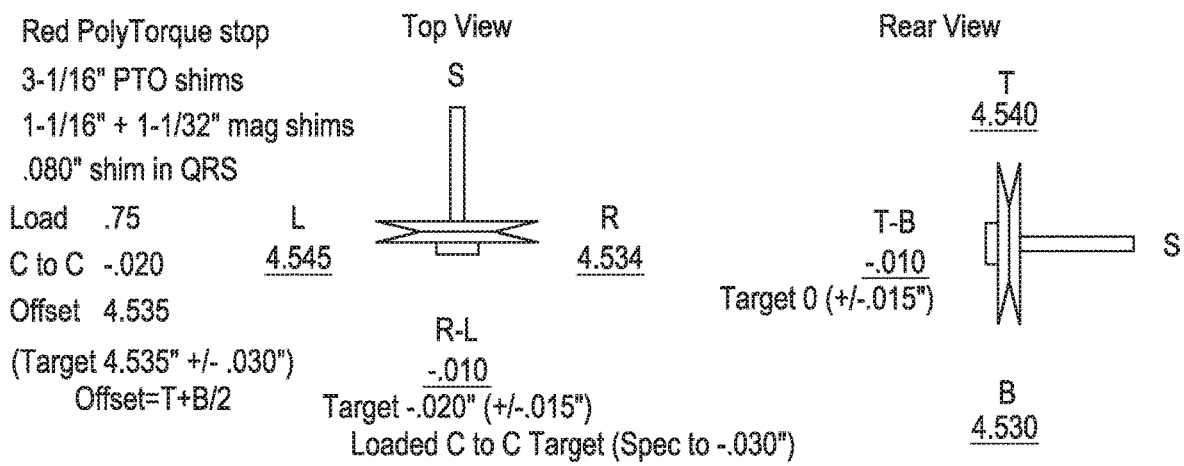
Figure 7A:
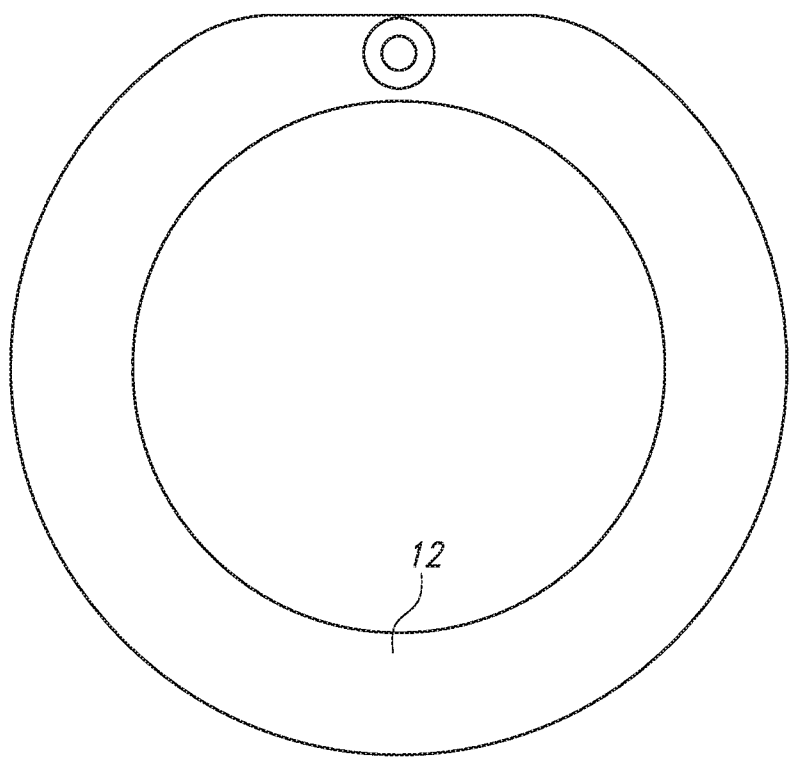
FIG. 7A is a top view of the clutch ring.
Figure 7B:
FIG. 7B is a side view of the clutch ring.
Figure 8A:
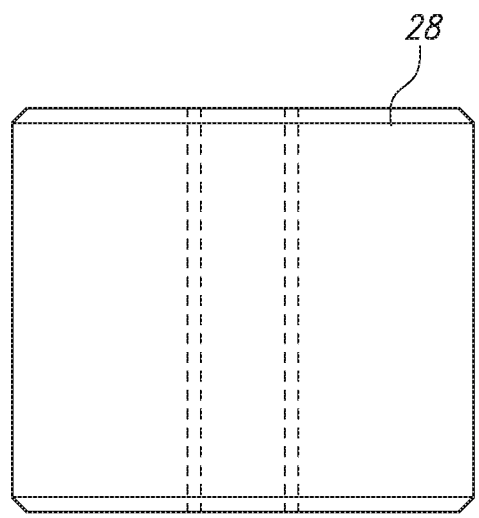
FIG. 8A is a side view of the standoff.
Figure 8B:
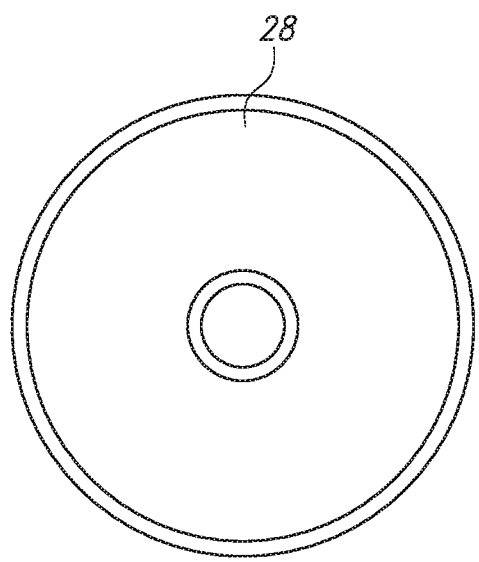
FIG. 8B is a top view of the standoff.
Figure 9A:
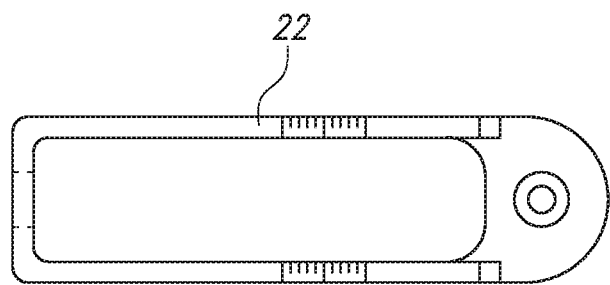
FIG. 9A is a top view of the housing.
Figure 9B:
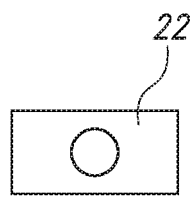
FIG. 9B is a bottom end view of the housing.
Figure 9C:
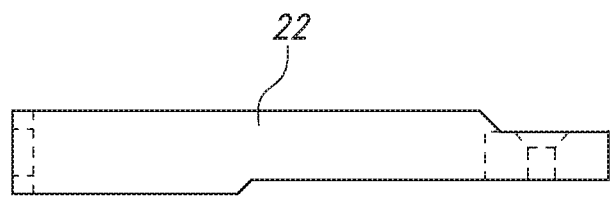
FIG. 9C is a side view of the housing.
Figure 10A:
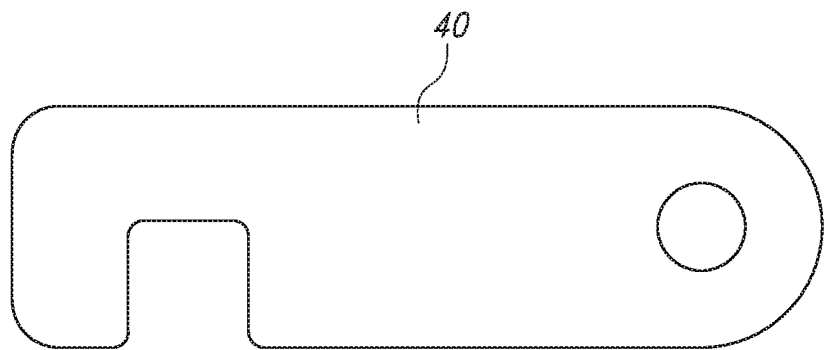
FIG. 10A is a top view of the clutch retainer.
Figure 10B:
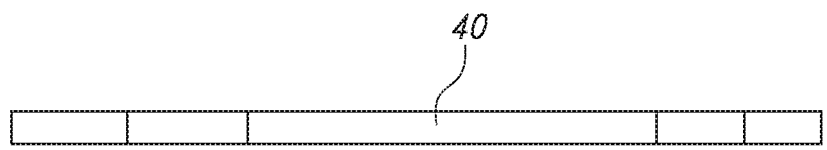
FIG. 10B is a side view of the clutch retainer.
Figure 11A:
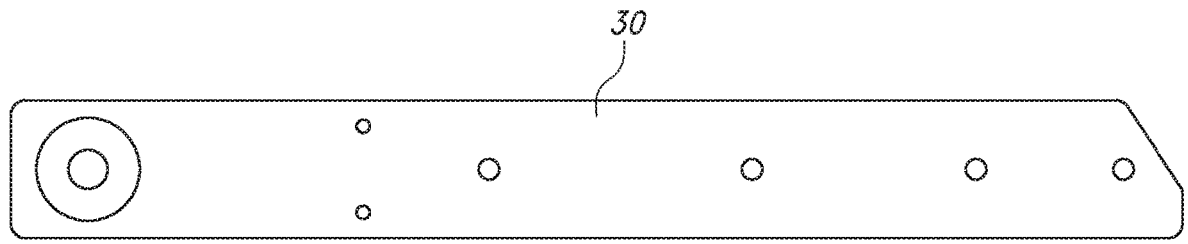
FIG. 11A is a top view of the alignment bar.
Figure 11B:
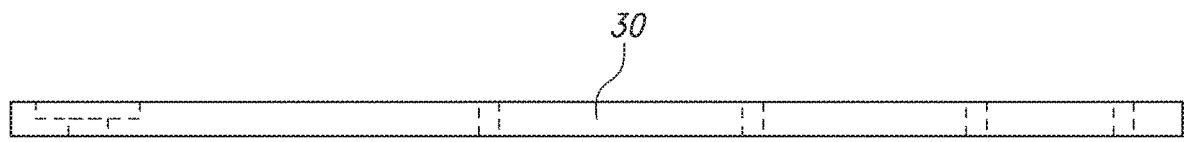
FIG. 11B is a side view of the alignment bar.

The housing 22 is marked with scribe marks 23, best shown in FIG. 4, to help indicate how much load applied by the spring. For example, with a 4-inch spring having a 500 lbs/in spring rate the marks may be 0.100" apart and extend from zero to 1" of preload. Tightening or loosening the preload fastener 26 adjusts the tension of the spring 24 as a result adjusts the load applied by the preloader 10.

The clutch retainers 40, best shown in FIGS. 3 & 4 and 10A & 10B, are sized and shaped to secure the clutch ring 12 in position on the primary clutch PC. More specifically, they are small but sturdy components having an opening 42 on one end that allows for the retainer 44 to be attached to the clutch using an existing threaded fastener 46, and small cutout 44 on the opposite end that is sized and shaped to fit around the clutch ring 12. Inserting the clutch retainers 40 around the clutch ring 12 and securing them in place with the threaded fasteners 46 ensures that the preloader 10 stays in position when a load is applied.

The alignment bar 30 is an approximately rectangular bar, possibly angled on one end, having an alignment bar opening 32 on one end. In use, the alignment bar 30 is secured to the primary clutch PC by the clutch bolt. The alignment bar 30 also has four measuring openings 34 that are labeled T for Top, B for Bottom, L for Left and R for Right. When the alignment bar is rotated each hole lines up with the outside band of the secondary clutch in the corresponding location on the clutch, i.e., the top, bottom, right side and left side.

The method 1000 of using the apparatus 100 is as follows. Certain measurements may change depending on the type of vehicle in which the transmission is used; when specific numbers are used in this example they are based on the proper measurements for a Skidoo G4 850. The form shown on FIG. 6 may be used to record measurements and calculations taken during performance of the method.

If the primary and secondary clutches are not accessible remove the snowmobiles side panels, hood, clutch guard, and cutch bolt access panel as needed in order to access both clutches. Place the clutch ring 12 over the primary clutch PC and secure it in place with the clutch retainers 40, and then insert the round standoff 28 into the secondary clutch SC shaft. Attach the alignment bar 30 to the primary clutch using the clutch bolt.

The first test is performed with zero load on the tensioner 13 to measure the positions of the clutches in relation to each other at rest. The alignment bar 30 is used to measure the distance between the outer band of the primary clutch PC and the outer band of the secondary clutch SC at a top position, bottom position, right side position and left side position. To obtain these measurements the measuring openings 34 are used. Specifically, first, the alignment bar 30 is rotated so the T hole (i.e. the top hole) lines up with the 12 o'clock position on the secondary clutch. While holding the alignment bar 30 in position tighten the primary clutch bolt by hand so the alignment bar is tight against the face of the primary clutch PC. Using a depth measuring tool, for example a 6" caliper depth measuring tool, measure through the T hole to the 12 o'clock location on the outer band of the secondary clutch and record the measurement as a top offset.

Next, loosen the primary clutch PC bolt, either by hand or using a conventional tool such as wrench if needed, and rotate the alignment bar 30 so the B hole is aligned with the 6 o'clock position on the outer band of the secondary clutch, i.e. the bottom central position. Tighten the primary clutch PC bolt by hand so the alignment bar is tight against the clutch face. Use the depth measuring tool again to take the B position and record it on the form where it shows B in the first section as the bottom offset. Repeat this procedure for the L (9 o'clock) and R (3 o'clock) positions and record those measurements on the form in the first section as a right offset and left offset, respectively.

After the four measurements are recorded the following calculations are made, each of which has an offset goal.

The difference between the top offset and bottom offset, with the goal being 0+/−0.015"

The difference between the right offset the left offset, with the goal being−0.020"+/−0.015"

Next, the vertical distance between the clutches is measured. Snowmobile manufacturers have a specification that states the recommended vertical separation between the two clutches, which is measured between the outside diameters of the clutches. A center-to-center hexagon gauge 50 is provided as an accessory to the Apparatus 100, which, as shown in FIG. 1, is a hexagonal shaped device having three thicknesses. For this example, the three thicknesses are 0.723', 0.773', and 0.823', with 0.723' being the distance specified by the manufacturer. Slide the hexagon gauge between the clutches and use feeler gauges to obtain an exact measurement. The target measurement is between the manufacturer's specification and −0.030" of the specification.

The ideal load to apply in testing varies depending on the type and model of snowmobile. For example, through testing it has been determined that for a Skidoo G4 850 using the clutch pre-loader 10 at a 0.75" load puts the two clutches in a position that is representative of the position each have when the throttle is in a half open position. To provide this load, tighten the preload fastener until the bottom side is halfway between the 0.7" and the 0.8" scribe marks, which is 0.75" of clutch preload. In the embodiment shown, the spring is 4" long with no load on it. A caliper may also be used to measure the spring length when it is set it to 0.75" for a more accurate and repeatable measurement. Repeat the measurement procedure as described above for the zero load measurements under this simulated load and record the load measurements.

These two sets of measurements illustrate the clutch alignment when the engine is at rest and when it is under normal operating conditions. With this information a user may then use a conventional motor mount shimming kit to adjust the position of at least one of the clutches in order to create an alignment that is more advantageous for normal riding conditions. Once an adjustment has been made a new set of measurements should be made under the desired load to confirm the desired results, and if the clutches have not reached the target alignment further adjustments should be made and the test conducted again until the target alignment is reached.

It is understood that the embodiments described herein are merely illustrative of the present invention. Variations in the construction of the clutch alignment apparatus and method of use may be contemplated by one skilled in the art without limiting the intended scope of the invention herein disclosed and as defined by the following claims.

What is claimed is:

1. A clutch pre-loader adapted to place a load between a primary clutch and a secondary clutch in a continuously variable transmission, the clutch pre-loader comprising:
    a clutch ring that is connected to an adjustable tensioner;
    wherein the clutch ring is configured to connect to one of the primary clutch or the secondary clutch and the adjustable tensioner is configured to connect to the primary clutch or secondary clutch that is not connected to the clutch ring; and
    wherein the adjustable tensioner is adjusted to apply a load between the primary clutch and the secondary clutch.

2. The clutch pre-loader of claim 1, wherein the adjustable tensioner includes a rod having a first end and a second end, a spring, and a preload fastener;
    and wherein the first end of the rod is connected to the clutch ring, the spring is inserted over the rod, and the preload fastener is adjustably connected to the second end of the rod, and wherein adjusting the placement of the preload fastener on the rod adjusts the load applied by the spring.

3. The clutch pre-loader of claim 2, the adjustable tensioner further including a housing and wherein the rod extends from the clutch ring into the housing.

4. The clutch pre-loader of claim 3, the housing further including a standoff that is configured to be inserted into the secondary clutch, the housing also including scribe marks.

5. The clutch pre-loader of claim 2, wherein the second end of the rod is threaded and the preload fastener is a nut.

6. The clutch pre-loader of claim 1, wherein the clutch ring is connected to the tensioner by a spherical ball joint.

7. A method of aligning a primary clutch and a second clutch in a continuously variable transmissions, the method comprising the following steps:
    attaching a clutch preloader to the primary clutch and the secondary clutch, the clutch preloader including a clutch ring that connects to either the primary clutch or the secondary clutch and a tensioner that connects to the other clutch;
    adjust the tensioner to add a predetermined load between the primary clutch and secondary clutch;
    measure the distance between the primary clutch and the secondary clutch;
    remove the clutch preloader; and
    adjust the position of the primary clutch and/or the secondary clutch.

8. The method of claim 7, wherein the set of measuring the distance between the primary clutch and the secondary clutch includes the following steps:
    Connect an alignment bar to the primary clutch to measure the distance between the primary clutch the secondary clutch.

9. The method of claim 8, wherein the alignment bar is used to measure the distance between the primary clutch and the secondary clutch from a right side position, a left side position, a top position, and a bottom position;
    calculating a top-bottom offset by subtracting the bottom position from the top position, calculating a side offset by subtracting the right side position from the left side position; and
    adjusting the position of the primary clutch and/or secondary clutch based on the top-bottom offset and side offset.

10. The method of claim 9, further including the step of measuring the vertical distance between a top portion of the primary clutch and a bottom portion of the secondary clutch and using that measurement to determine how to adjust the position of the primary clutch and/or secondary clutch.

11. The method of claim 9 wherein the alignment bar has 4 measuring openings that are configured to measure the right side position, the left side position, the top position, and the bottom position.

* * * * *